United States Patent
Haldorsen

(10) Patent No.: US 7,512,034 B2
(45) Date of Patent: Mar. 31, 2009

(54) DRILL NOISE SEISMIC DATA ACQUISITION AND PROCESSING METHODS

(75) Inventor: Jakob B. U. Haldorsen, Norwalk, CT (US)

(73) Assignee: Schlumberger Technology Corporation, Ridgefield, CT (US)

(*) Notice: Subject to any disclaimer, the term of this patent is extended or adjusted under 35 U.S.C. 154(b) by 103 days.

(21) Appl. No.: 11/227,895

(22) Filed: Sep. 15, 2005

(65) Prior Publication Data

US 2007/0064532 A1    Mar. 22, 2007

(51) Int. Cl.
*G01V 1/20* (2006.01)
*G01V 1/28* (2006.01)
(52) U.S. Cl. .................................. 367/57; 181/112
(58) Field of Classification Search ............. 367/56–57, 367/20, 81; 181/112
See application file for complete search history.

(56) References Cited

U.S. PATENT DOCUMENTS

| | | | | |
|---|---|---|---|---|
| 4,922,362 A | | 5/1990 | Miller et al. ................. 367/46 |
| 4,926,391 A | * | 5/1990 | Rector et al. ................. 367/41 |
| 5,074,360 A | * | 12/1991 | Guinn ......................... 166/281 |
| 5,148,407 A | * | 9/1992 | Haldorsen et al. ............ 367/32 |
| 5,191,557 A | * | 3/1993 | Rector et al. ................. 367/41 |
| 5,253,217 A | * | 10/1993 | Justice et al. ................ 367/46 |
| 5,680,906 A | * | 10/1997 | Andrieux et al. ............. 175/45 |
| 5,790,473 A | * | 8/1998 | Allen .......................... 367/57 |
| 5,901,113 A | * | 5/1999 | Masak et al. ................. 367/57 |
| 6,049,758 A | * | 4/2000 | Bunks et al. ................. 702/14 |
| 6,166,994 A | * | 12/2000 | Jeffryes ....................... 367/57 |
| 6,279,658 B1 | * | 8/2001 | Donovan et al. ............. 166/313 |
| 6,478,107 B1 | * | 11/2002 | Birchak et al. .............. 181/113 |
| 6,747,914 B2 | * | 6/2004 | Aronstam .................... 367/31 |

(Continued)

FOREIGN PATENT DOCUMENTS

EP        294158 A2  *  12/1988

(Continued)

OTHER PUBLICATIONS

Haldorsen et al, Multichannel Wiener Deconvolution of Vertical Seismic Profiles. Geophysics. vol. 59, No. 10 (Oct. 1994). pp. 1500-1511.*

(Continued)

*Primary Examiner*—Ian J Lobo
(74) *Attorney, Agent, or Firm*—Jody Lynn DeStefanis; Vincent Loccisano; James McAleenan

(57) ABSTRACT

A method of acquiring seismic data that includes deploying a first array of seismic receivers and a second array of seismic receivers, and simultaneously receiving drill noise seismic energy produced as a wellbore is drilled relatively near the first and second arrays of seismic receivers using the first and second array of seismic receivers, wherein the first array of seismic receivers is closer to the source of the drill noise seismic energy than the second array of seismic receivers. A related method for processing seismic data and computer useable media are also described. Also a method of acquiring seismic data that includes deploying a first array of seismic receivers within a borehole, receiving seismic energy produced as a wellbore is drilled relatively near first array using said seismic receivers, and recording seismic data associated with the received seismic energy. A related method for acquiring and processing seismic data is also described.

19 Claims, 2 Drawing Sheets

U.S. PATENT DOCUMENTS

| | | | |
|---|---|---|---|
| 6,823,265 B2 * | 11/2004 | Haldorsen | 702/9 |
| 6,868,037 B2 * | 3/2005 | Dasgupta et al. | 367/54 |
| 6,965,849 B1 * | 11/2005 | Cao et al. | 703/10 |
| 2002/0062992 A1 * | 5/2002 | Fredericks et al. | 175/40 |
| 2003/0010565 A1 * | 1/2003 | Brooks et al. | 181/116 |
| 2004/0047234 A1 * | 3/2004 | Armstrong et al. | 367/81 |
| 2004/0129424 A1 * | 7/2004 | Hosie et al. | 166/332.8 |
| 2005/0052949 A1 * | 3/2005 | Gaston et al. | 367/57 |
| 2005/0122840 A1 | 6/2005 | Haldorsen | 367/57 |
| 2006/0256658 A1 * | 11/2006 | Christie et al. | 367/43 |

FOREIGN PATENT DOCUMENTS

| | | |
|---|---|---|
| GB | 2173596 A | 10/1986 |
| GB | 2262340 A | 6/1993 |
| WO | WO 85/05696 | 12/1985 |
| WO | WO 88/04435 A1 | 6/1988 |
| WO | WO 93/07514 A1 | 4/1993 |
| WO | WO 02/31538 A1 | 4/2002 |

OTHER PUBLICATIONS

Bernasconi et al. Efficient Data Compression for Seismic-While-Drilling Applications. IEEE Transactions on Geoscience and Remote Sensing. vol. 41. No. 3. Mar. 2003.*

Haldorsen, J.B.U., Miller, D.E., and Walsh, J.J. "Walk-away VSP using drill noise as a source." *Geophysics* vol. 60, No. 4 (Jul.-Aug. 1995): pp. 978-997.

Haldorsen, J.B.U., Miller, D.E., Walsh, J.J., and Zoch, H.-J. "Multichannel Approach to Signature Estimation and Deconvolution for Drill Bit Imaging." $62^{nd}$ Ann. Internet. Mtg., Soc. Expl. Geophysics, Expanded Abstracts (1992b): pp. 181-184.

Haldorsen, J.B.U.. Miller, D.E., and Walsh. J.J. "Multichannel Wiener deconvolution of vertical seismic profiles." *Geophysics*. vol. 59, No. 10 (Oct. 1994): pp. 1500-1511.

Rector, J.W., Marion, B.P., and Widrow, B. "Use of Drill-Bit Energy as a Downhole Seismic Source." $58^{th}$ Ann. Internat. Mtng., Soc. Expl. Geophys., Expanded Abstracts (1988): pp. 161-164.

Rector, J.W. III. "Utilization of drill bit vibrations as a downhole seismic source." Diss. Stanford University. 1990.

Rector, J.W., III, and Marion, B.P. "The use of drill-bit energy as a downhole seismic source." *Geophysics. Soc. Of Expl. Geophys*. vol. 56, No. 5 (May 1991): pp. 628-634.

Rector, J.W., III, and Hardage, B.A. "Radiation pattern and seismic waves generated by a working roller-cone drill bit." *Geophysics*. vol. 57. No. 10 (Oct. 1992): pp. 1319-1333.

Combined Search and Examination Report under Sections 17 and 18(3) by the Unikted Kingdom Patent Office for Application No. GB0617247.2, dated Nov. 29, 2006.

* cited by examiner

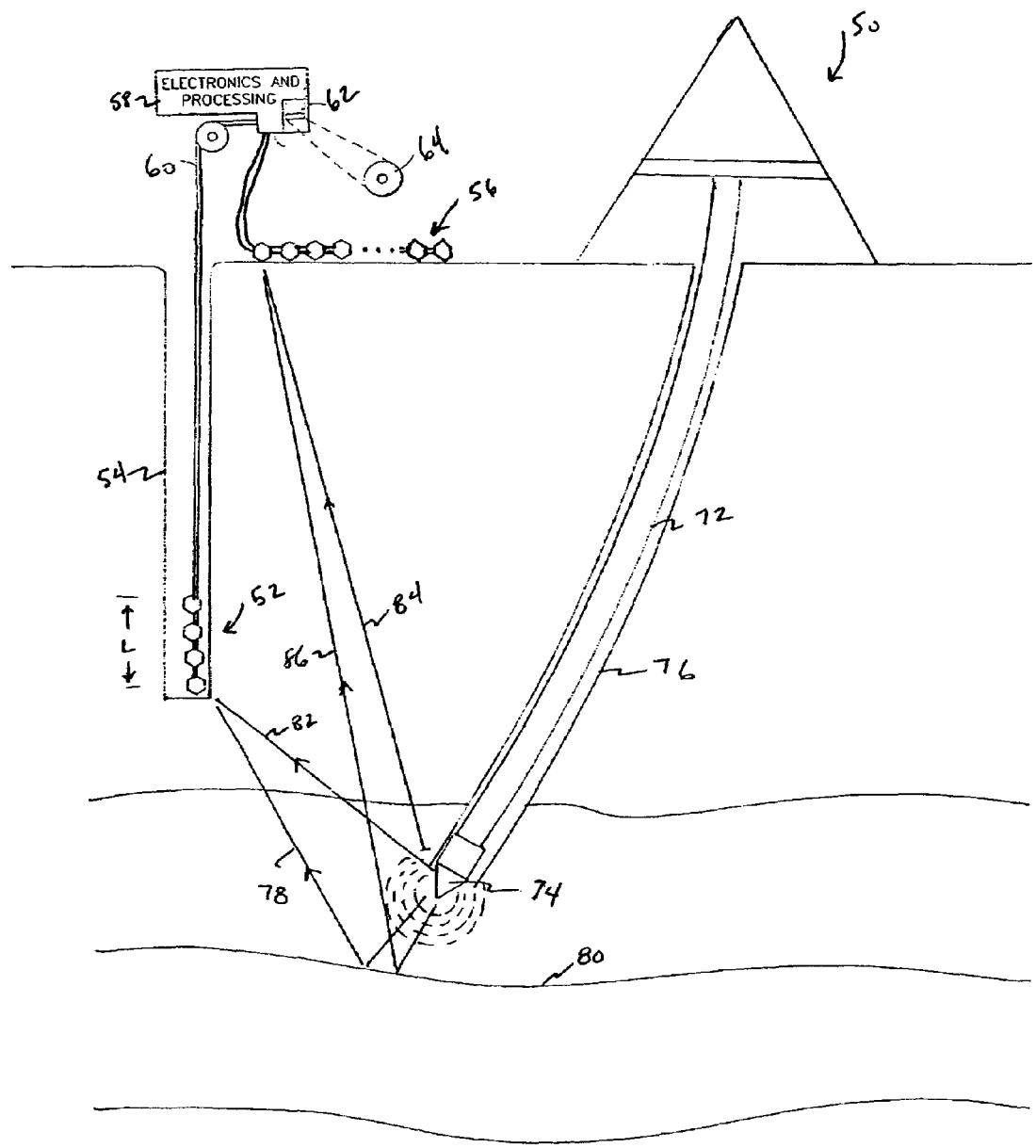

DRILL NOISE SEISMIC DATA ACQUISITION AND PROCESSING METHODS

FIELD OF THE INVENTION

This invention relates to the acquisition and processing of seismic data and, more particularly, to methods for acquiring and processing seismic data obtained using drill noise as a source of seismic energy.

BACKGROUND

Vertical seismic profiling (VSP) is a technique that typically involves the creation of reflection images of the subsurface from seismic data acquired using an array of downhole geophones and a surface seismic source. A "reverse" VSP procedure is also known where the geophones are located at the surface and the seismic source (such as an operating drill bit) is located downhole. The usefulness of drilling noise as a source of seismic energy, however, depends in large part on the signal bandwidth and on how well one can estimate the acoustic signature of the radiated signal.

To use an operating drill bit as a seismic source, the continuous, chaotic signal generated at the bit must be converted to an equivalent impulse. Techniques described in previously published work in this area have typically relied on measurements made by accelerometers on the drill string to provide an estimate of the seismic signature of the drill bit. See, for instance, Staron, P., Gros, P., and Arens, G., 1985, UK Patent Application GB2173596A; Rector, J. W., Marion, B. P., and Widrow, B., 1988, Use of drill-bit energy as a downhole seismic source: 58nd Ann. Mtng., Soc. Expl. Geophys., Expanded Abstracts, 161-164; Rector, J. W., 1990, Utilization of drill bit vibrations as a downhole source: Ph.D. thesis, Stanford University; Rector, J. W., and Marion, B. P., 1991, The use of drill-bit energy as a downhole seismic source: Geophysics, 56, 628-634; and Rector, J. W., and Hardage, B. A., 1992, Radiation pattern and seismic waves generated by a working roller-cone drill bit: Geophysics, 57, 1319-1333, each of which is incorporated herein by reference. From this estimate of the seismic signature, an inverse filter is derived that is then applied to reduce the data to an estimate of the earth impulse response. To obtain a good estimate of the drill-bit signature from these accelerometers, one first has to remove the drill-string transfer function and unrelated noise from the accelerometer measurement.

A significant problem with this approach is that for deviated wells, friction between the borehole wall and the drill string may strongly attenuate the axial vibrations along the drill string and render the measurements made by the drill-string accelerometer effectively useless.

Another type of method is described in U.S. Pat. No. 5,148,407, to Haldorsen, J., Farmer, P., and Desler, J., 1992, entitled "Method for vertical seismic profiling"; in U.S. Pat. No. 4,922,362, to Miller, D., Haldorsen, J., and Kostov, C., 1990, entitled "Methods for deconvolution of unknown source signatures from unknown waveform data"; in Haldorsen, J.B.U., Miller, D. E., and Walsh, J., 1995, Walk-away VSP using drill noise as a source, Geophysics, 60, 978-997; and Haldorsen, J., Miller, D. Walsh, J., and Zoch, H.-J., 1992b, A multichannel approach to signature estimation and deconvolution for drill-bit imaging: $62^{nd}$ Ann. Internat. Mtg., Soc. Expl. Geophysics, Expanded Abstracts, 181-184, each of which are incorporated herein by reference. This type of method makes use of the focusing capability of a large array of surface geophones both to obtain the drill-bit signature and to provide an optimal, multichannel deconvolution filter. However, in this type of seismic data acquisition scenario, the receivers are located in a very noisy environment (the earth's surface) and this introduces significant difficulty into the process of obtaining the drill-bit signature. In addition, the relatively large dimensions of the required surface geophone array (the array typically has a length that is approximately one or two times the depth of the drill noise source) have often limited the commercial viability of this type of "reverse" VSP procedure.

For these reasons, it would be of great benefit to be able to acquire and process seismic data obtained using a drill noise source using methods that do not suffer from one or more of the problems described above.

SUMMARY OF INVENTION

One aspect of the invention involves a method of acquiring seismic data that includes deploying a first array of seismic receivers and a second array of seismic receivers, and simultaneously receiving drill noise seismic energy produced as a wellbore is drilled relatively near the first and second arrays of seismic receivers using the first and second array of seismic receivers, wherein the first array of seismic receivers is closer to the source of the drill noise seismic energy than the second array of seismic receivers.

Another aspect of the invention involves a method of processing seismic data that includes estimating a drill noise source signature from seismic data acquired by a first array of seismic receivers and associated with seismic energy produced as a wellbore was drilled relatively near the first array of seismic receivers, and using the estimate of the drill noise source signature while processing seismic data acquired simultaneously by a second array of seismic receivers located farther away from the source of the drill noise seismic energy than the first array of seismic receivers.

A further aspect of the invention involves a computer useable medium having computer readable program code means embodied therein that allows the inventive method for processing seismic data to be performed.

An additional aspect of the invention involves a method of acquiring seismic data that includes deploying a first array of seismic receivers within a borehole, receiving seismic energy produced as a wellbore is drilled relatively near the first array using the seismic receivers, and recording seismic data associated with the received seismic energy.

Another aspect of the invention involves a method of acquiring and processing seismic data that includes deploying a first array of seismic receivers within a borehole, receiving seismic energy produced as a wellbore is drilled relatively near the first array using the seismic receivers, recording seismic data associated with the received seismic energy, and estimating one or more characteristics of the seismic energy using the recorded seismic data.

Further details and features of the invention will become more readily apparent from the detailed description that follows.

BRIEF DESCRIPTION OF FIGURES

The invention will be described in more detail below in conjunction with the following Figures, in which:

FIG. 2 schematically illustrates the acquisition of seismic data using a drill noise source and arrays of seismic receivers located in a borehole and on the earth's surface.

DETAILED DESCRIPTION

Figure 1:
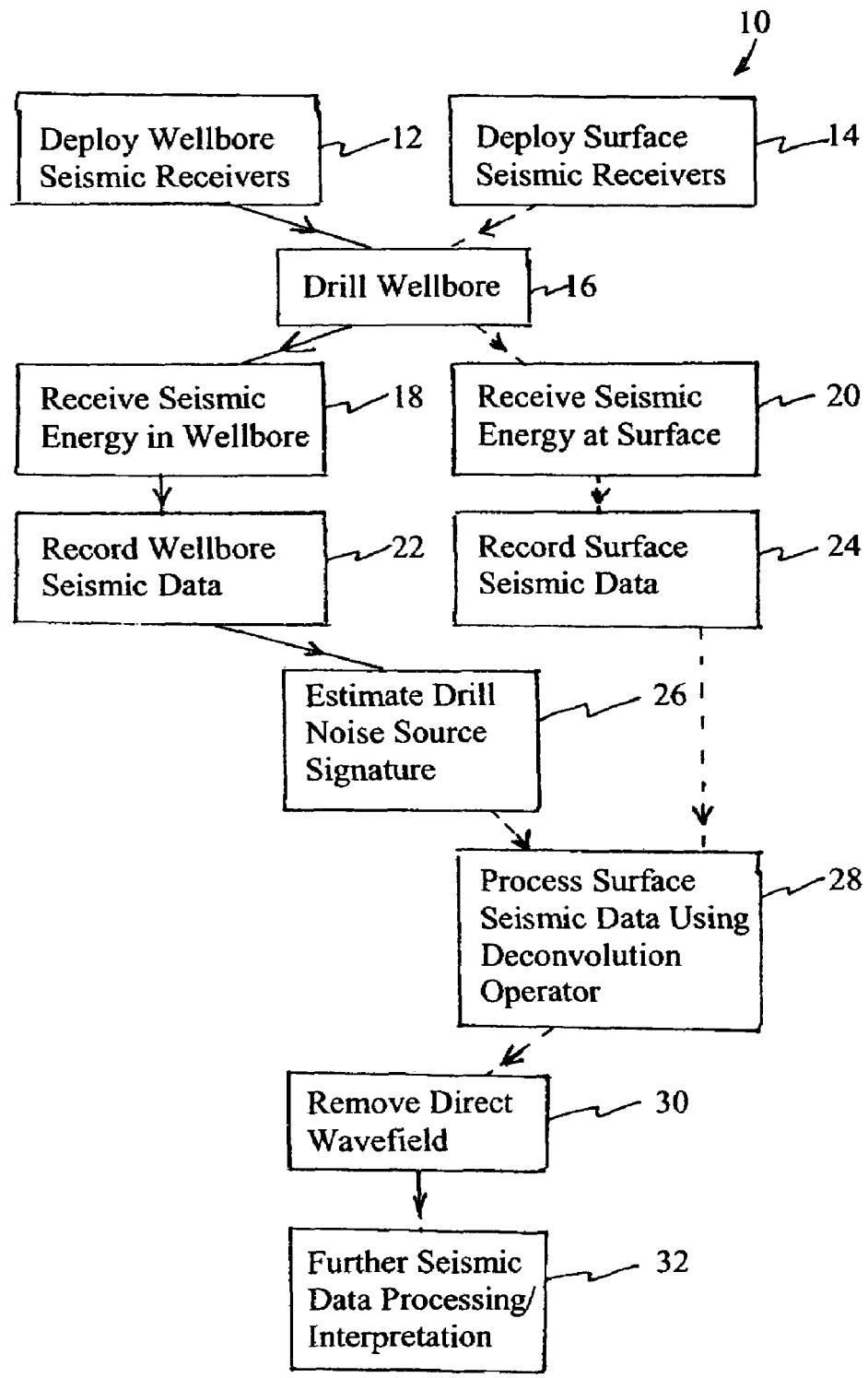
FIG. 1 is a flowchart depicting processes associated with certain embodiments of the present invention.

FIG. 1 is a flowchart that depicts various processes associated with certain embodiments of the present invention. Inventive Process 10 begins with the deployment of a first array of seismic receivers, such as in a borehole, shown in FIG. 1 as Deploy Wellbore Receivers 12. The first array will often consist of a co-linear evenly spaced group of geophones. Other types of the array geometries may also be used, such as a 2 dimensional or 3 dimensional array and the seismic receivers may be geophones, hydrophones, multi-component geophones, etc. A typical borehole receiver array may have an array length of between 35 and 100 meters. This array of seismic receivers will preferentially be placed in a relatively quiet area (i.e. isolated from noise) as near as possible to the drill noise seismic source (such as by being placed in a previously drilled borehole, suspended from a buoy in a marine environment, embedded within or deployed adjacent to seafloor sediments, etc.). Preferentially, the major axis of the array is aligned so that the group of seismic receivers does not receive an incoming seismic wavefront simultaneously or almost simultaneously. In the context of this application, the term "array of seismic receivers" explicitly excludes any group of seismic receivers that receive drill noise seismic energy through direct coupling to a drill collar, drill pipe, or any related component of a drill rig.

Another array of seismic receivers may also be deployed, such as on the earth's surface, shown in FIG. 1 as Deploy Surface Receivers 14. This array of seismic receivers, referred to herein as the second array, will often be a substantially larger 3 dimensional array of seismic receivers that will receive seismic data illuminating a significantly larger portion of the subsurface and could alternatively comprise a towed or seafloor array of marine seismic receivers.

After the desired seismic receivers are deployed, a borehole is drilled relatively near the first array of seismic receivers (i.e. sufficiently near to the seismic receivers in the first array that the seismic energy produced as the borehole is drilled is able to be detected by the seismic receivers), shown in FIG. 1 as Drill Wellbore 16.

The seismic energy produced as the borehole is drilled propagates through the earth's subsurface (both through direct and reflected transmission modes, as discussed below) and is received by the first array of seismic receivers, shown in FIG. 1 as Receive Energy in Wellbore 18. In certain embodiments of the inventive method, the separation between the seismic energy source and the first array of seismic receivers may range between 50 and several thousands of meters. The seismic energy produced as the borehole is drilled may also be received by the second array of seismic receivers, such as those that may be located on the surface, shown as Receive Energy at Surface 20 in FIG. 1. Data describing the seismic energy received by the first array of seismic receivers is recorded, shown in FIG. 1 as Record Wellbore Seismic Data 22. If the second array of seismic receivers is used, data describing the seismic energy received by these seismic receivers is also recorded, shown in FIG. 1 as Record Surface Seismic Data 24.

Characteristics of the drill noise (such as its source signature) can be estimated using the recorded seismic data from the first array of seismic receivers, as shown in FIG. 1 as Estimate Drill Noise Signature 26. As described below, this process may consist of wavefield deconvolving the seismic data. If the second seismic receiver array is used, this estimate of the drill noise signature (such as a deconvolution operator produced when the seismic data is subjected to wavefield deconvolution) may be used to process the recorded seismic data obtained using this second seismic receiver array. This is shown in FIG. 1 as Process Seismic Data Using Deconvolution Operator 28. Because most seismic data interpretation techniques utilize reflected (rather than direct) arrivals, the direct wavefield may be removed from the processed seismic data. This is shown in FIG. 1 as Remove Direct Wavefield 30. The data may also be subsequently displayed or subjected to additional seismic data processing and/or interpretation techniques, shown in FIG. 1 as Further Processing/Interpretation 32. Many of these processes will be discussed and described in further detail below.

The inventive methods of acquiring and processing seismic data are based on the realization that it is possible, and often advantageous, to estimate characteristics of a drill noise seismic source (such as its source signature) using a relatively small array of seismic sensors located in a relatively quiet environment. It was previously believed that the size of the array typically needed to be about as large as or larger than the distance between the array of seismic receivers and the seismic source. In some applications, the inventive method will involve using an essentially vertical array of sensors deployed in a separate borehole to determine the acoustic signature of an operating drill bit. By deploying the receivers in a relatively quiet environment in a borehole reasonably close to the drill bit, there is significantly less noise in the measurements and this can provide a better estimate of the acoustic signature of the operating drill bit.

FIG. 2 shows equipment associated with acquiring seismic data in accordance with certain embodiments of the inventive methods. In FIG. 2, a drill rig 50 is deployed on the earth's surface, a first array of seismic receivers 52 are deployed downhole in a wellbore, and a second array of seismic receivers 56 are shown deployed on the earth's surface. The downhole seismic receivers may, for instance, be part of a wireline tool, such as Schlumberger's Versatile Seismic Imager (VSI™) tool, which has four or more seismic receivers. These seismic receivers may be connected to surface electronics equipment 58 by a wireline cable 60. The surface electronics equipment will typically contain recording hardware that will record the seismic data obtained by the seismic receivers. The surface electronics equipment may also contain a computer processor to process the received data and such a computer processor will typically have a media reader, such as CD drive 62, for reading computer software instructions from a software storage device, such as CD 64. The computer software may allow the computer processor to process the received seismic data in accordance with the inventive methodology taught herein. It will be understood that various parts of the data processing operations may be performed downhole, performed at the wellsite, or performed away from the wellsite. The second array of seismic receivers 56 may also be connected to the surface electronics equipment 58 or a similar apparatus through wired or wireless telemetry systems.

In operation, the drill rig 50 includes a drill pipe string 72 having a drill bit 74 at its distal end. As the drill pipe string 72 is rotated, the drill bit 74 progressively forms borehole 76 and in the process releases a great deal of energy at seismic frequencies. Some of this energy passes directly through the geologic subsurface and is received by the plurality of seismic receivers 52, shown as direct arrival raypath 82, and some of which is reflected at geologic interfaces (where differing geologic strata on opposing sides of the interfaces have contrasting acoustic impedances), such as geologic interface 80, shown as reflected arrival raypath 78. Other portions of this energy passes directly through the geologic subsurface and is received by seismic receiver array 56, shown as direct arrival raypath 84, and further portions of which are reflected at geologic interfaces, such as geologic interface 80, shown as reflected arrival raypath 86.

It will be understood to those skilled in the art that various alternatives to the described configuration can be used to acquire and process seismic data using a drill noise source. Instead of forming part of a wireline tool, for instance, the first array of seismic receivers may be permanently or semi-permanently installed in the formation. Data from the seismic receivers can be recorded using permanently or semi-permanently installed cables, using acoustic pulse transmission systems, using electromagnetic wireless transmission systems, etc. In a marine environment, the first array of seismic receivers may alternatively be suspended in the water column, such as beneath a buoy, and the second array of seismic receivers may alternatively be placed on the sea bottom or incorporated into streamers that are towed behind a vessel.

It is possible to estimate many different characteristics of the seismic source using the seismic data obtained by the first array, such as source/receiver separation distance, source direction, and source signature. The process of estimating the drill noise source signature typically involves wavefield deconvolving the seismic data acquired by the first array of seismic receivers. Four basic processing steps may be used to transform the drill-noise data into an image of the formation. First, focusing analysis may be applied to find the time shifts between the individual receivers to determine the time shifts that focus most of the energy toward the location of the drill bit. This may include cross-correlating adjacent traces to provide an estimate of the time delay between direct arrivals. Second, a uniform deconvolution filter may be designed and applied that best spikes the moveout-corrected traces. Third, the moveout times may be corrected by picking break times on the deconvolved data and the previous step is repeated. The next step may consist of wavefield deconvolution.

The wavefield deconvolution process preferentially utilizes a multi-trace least-squares inverse filter of the type described in Haldorsen, J. B. U., Miller, D. E., and Walsh, J., Multichannel Wiener deconvolution of vertical seismic profiles, Geophysics, Vol. 59, No. 10 (October 1994), pp. 1500-1511 (incorporated herein by reference). This filter is a frequency-domain operator with a dual objective; it attempts to spike the direct arrivals and at the same time to minimize the difference between the total recorded field and the estimated direct arrivals. The algebraic solution to this optimization problem can be written as a product between a conventional inverse of the direct down-going field with the semblance associated with the estimation of the signature of the direct down-going field:

$$F_n(\omega) = \frac{f_n^*(\omega)}{E_n(\omega)} = \frac{f_n^*(\omega)}{|f_n(\omega)|^2} \frac{|f_n(\omega)|^2}{E_n(\omega)} \quad [1]$$

$$f_n(\omega) = \langle d_k(\omega) e^{-i\omega t_k} \rangle_{k=n-J,n+J}$$

$$E_n(\omega) = \langle |d_k(\omega)|^2 \rangle_{k=n-J,n+J}$$

Here $\omega$ is the angular frequency, $d_k$ is the data of trace k, and $t_k$ is the first-break time for trace k. The symbol * denotes complex conjugation, and $\langle \ldots \rangle$ denotes the expectation value. The subscript indicates that the expectation value is taken within a window of width 2J+1 centered on trace n. The symbols f and E represent estimates of the direct source signature and the total energy, respectively. Depending on the character of the noise, the expectation value can best be calculated by a mean or a median operation. A median estimator may be used that will allow the filter to adapt to changes in the source signature consistently present over at least half the spatial length of the filter. It is easily seen from Equation 1 that the spectrum of the deconvolved signature ($F_n(\omega)f(\omega)$) is equal to the semblance spectrum (as discussed in Haldorsen, et al., 1994).

The quantity $f(\omega)$ is dominated by a term that is the result of a convolution of the real, physical acoustic signature of the drill bit with the transfer function of the formation between the drill bit and the receiver array. Applying the filter described above to the data effectively replaces the acoustic signature of the drill bit by the inverse of this (band-limited) transfer function. It is expected that the drill-bit signature dominates, and that the transfer function term is an order-of-magnitude less energetic. In the following, a method is discussed which could remove this inverse transfer function.

The semblance of the wavefield deconvolution process is preferably used to recover the useable bandwidth of the data. This process preferentially comprises Semblance-Weighted Deconvolution using a sliding median estimator of length smaller than the total number of receivers in the receiver array.

Updated estimates of travel times of direct wave arrivals between the drill bit and the array of seismic receivers can also be obtained by picking the first breaks/initial arrivals from the deconvolved seismic data and these updated estimates can be used as input into another iteration of wavefield deconvolution process.

As the drilling progresses, a dataset is built up which is substantially equivalent to a fixed-offset VSP dataset, where the offset is related to the offset between the first receiver array and the new well being drilled. Each of the traces in this dataset can be characterized by the inverse of the transfer-function between the first receiver array and the at the time location of the drill-bit source. One should expect this transfer function to vary slowly, making it possible to estimate it from the data.

In order to do this, one uses reciprocity, changing the identification of the sources and receivers. This provides a fixed-offset VSP dataset with the source at the first receiver array location and receivers along the new drilled borehole. The processing described above can then be applied to this new dataset to estimate and remove the slowly varying transfer function introduced by the above processing steps.

The deconvolution operator obtained while processing the seismic data obtained from the first array of seismic receivers in accordance with the inventive methodology (which incorporates an estimate of the drill noise source signature) may by used to process the seismic data obtained by the second array of seismic receivers. This will result in a better quality seismic section than would have been possible if the estimate of the drill noise source signature had been derived solely from the seismic data obtained by the second array of seismic receivers that are located in a significantly more noisy environment and farther away from the drill-noise source than the first array.

At this point, the processed seismic data (from the Process Seismic Data Using Deconvolution Operator 28 process) would include both the direct and reflected arrivals. Because most seismic data processing and interpretation techniques use only seismic reflection data, the direct wavefield is typically removed from the seismic data using known techniques.

Those skilled in the art will appreciate that the processed seismic data can be used as input into various further seismic data processing and/or seismic data interpretation methods.

One particularly advantageous application of the inventive methodology is in connection with the development drilling in areas that are difficult to appropriately image using conventional seismic techniques, such as on the flanks of salt domes, beneath basalt intrusions, and underneath gas clouds where exploration wells near the targets can accommodate an array of seismic receivers. If the seismic data is processed relatively soon after collection, it may be used to image ahead of the drill bit and the images produced may be used to provide improved well placement.

While the invention has been described herein with reference to certain examples and embodiments, it will be evident that various modifications and changes may be made to the embodiments described above without departing from the scope and spirit of the invention as set forth in the claims. It will be understood, for instance, that various modifications may be made to the particular wavefield deconvolution algorithms described above. Instead of using a semblance weighted deconvolution operator, alternative operators could be used that, for instance, assign or assume a particular amplitude versus frequency semblance relationship in the data. It will also be understood that the seismic data being wavefield deconvolved is not required to be the raw, uncorrelated, unprocessed versions of the data received by the seismic receivers. The wavefield deconvolution process is capable of effectively operating on pre-processed versions of the seismic data provided the seismic data is not pre-processed in ways that significantly band limit or corrupt the data.

I claim:

1. A method of acquiring seismic data comprising:
   deploying a first array of seismic receivers and a second array of seismic receivers such that the seismic receivers of the first array do not simultaneously receive an incoming wavefront with respect to each other, and such that the seismic receivers of the second array do not simultaneously receive the incoming wavefront,
   receiving an incoming wavefront of drill noise seismic energy produced as a wellbore is drilled using said first and second arrays of seismic receivers, wherein said first array of seismic receivers is closer to the source of said drill noise seismic energy than said second array of seismic receivers;
   utilizing data obtained by the first array of seismic receivers to estimate at least one seismic source characteristic selected from the group consisting of: source/receiver separation distance, source direction, and source signature; and
   utilizing the characteristic to process data obtained by the second array of seismic receivers.

2. A method of acquiring seismic data in accordance with claim 1, wherein said first array of seismic receivers is deployed within a borehole, suspended beneath a buoy, or embedded within or deployed in contact with seafloor sediments.

3. A method of acquiring seismic data in accordance with claim 2, wherein said second array of seismic receivers is deployed on the earth's surface, towed behind a vessel, or deployed on the seafloor.

4. A method of processing seismic data comprising:
   estimating a drill noise source signature from seismic data acquired by a first array of seismic receivers and associated with seismic energy produced as a wellbore was drilled, and
   using said estimate of the drill noise source signature while processing seismic data acquired by a second array of seismic receivers located farther away from the source of said drill noise seismic energy than said first array of seismic receivers;
   wherein the seismic receivers of the first array are arranged so that they do not simultaneously receive an incoming wavefront of drill noise with respect to each other, and wherein the seismic receivers of the second array are arranged so that they do not simultaneously receive the incoming wavefront with respect to each other.

5. A method of acquiring seismic data in accordance with claim 4, wherein said first array of seismic receivers was deployed within a borehole, suspended beneath a buoy, or embedded within or deployed in contact with seafloor sediments.

6. A method of acquiring seismic data in accordance with claim 5, wherein said second array of seismic receivers was deployed on the earth's surface, towed behind a vessel, or deployed on the seafloor.

7. A method of processing seismic data in accordance with claim 4, wherein said drill noise source signature is estimated using a semblance-weighted wavefield deconvolution process.

8. A method of processing seismic data in accordance with claim 7, wherein said wavefield deconvolution process comprises calculating an expectation value by a mean or a median operation.

9. A method of processing seismic data in accordance with claim 8, wherein a median estimator is used having a spatial length less than the total number of receivers in the first array of seismic receivers.

10. A method of processing seismic data in accordance with claim 4, further comprising removing direct wavefield energy from said seismic data processed using said drill noise source signature estimate.

11. An article of manufacture, comprising:
    a computer useable medium having computer readable program code means embodied therein for processing seismic data, the computer readable program code means in said article of manufacture comprising:
    computer readable program means for estimating a drill noise source signature from seismic data acquired by a first array of seismic receivers and associated with seismic energy produced as a wellbore was drilled, and
    computer readable program means for using said estimate of the drill noise source signature while processing seismic data acquired by a second array of seismic receivers located farther away from the source of said drill noise seismic energy than said first array of seismic receivers;
    wherein the seismic receivers of the first array are arranged so that they do not simultaneously receive an incoming wavefront of drill noise with respect to each other, and wherein the seismic receivers of the second array are arranged so that they do not simultaneously receive an incoming wavefront with respect to each other.

12. A method of acquiring seismic data comprising:
    deploying a first array of seismic receivers within a borehole such that those seismic receivers do not simultaneously receive an incoming wavefront with respect to each other;
    deploying a second array of seismic receivers outside the borehole such that those seismic receivers do not simultaneously receive the incoming wavefront with respect to each other;
    receiving seismic energy produced as a wellbore is drilled using said seismic receivers of the first and second arrays,
    utilizing data obtained by the first array of seismic receivers to estimate at least one seismic source characteristic selected from the group consisting of: source/receiver separation distance, source direction, and source signature;

utilizing the characteristic to process data obtained by the second array of seismic receivers; and recording the processed seismic data.

13. A method of acquiring seismic data in accordance with claim 12, wherein said first array of seismic receivers is deployed within a borehole, suspended beneath a buoy, or embedded within or deployed in contact with seafloor sediments.

14. A method of acquiring seismic data in accordance with claim 12, wherein said second array of seismic receivers is deployed on the earth's surface, towed behind a vessel, or deployed on the seafloor.

15. A method of acquiring seismic data in accordance with claim 14, wherein direct arrivals of seismic energy received by said second array of seismic receivers travel farther than direct arrivals of seismic energy received by said first array of seismic receivers.

16. A method of acquiring and processing seismic data comprising:

deploying a first array of seismic receivers within a borehole such that those seismic receivers do not simultaneously receive the incoming wavefront with respect to each other;

deploying a second array of seismic receivers outside the borehole such that those seismic receivers do not simultaneously receive the incoming wavefront with respect to each other;

receiving seismic energy produced as a wellbore is drilled using said seismic receivers of the first and second arrays, recording seismic data associated with said received seismic energy, and estimating one or more characteristics of said seismic energy received by the first array of seismic receivers using said recorded seismic data, and utilizing at least one of the characteristics to process data obtained by the second array of seismic receivers.

17. A method of acquiring and processing seismic data in accordance with claim 16, wherein said one or more characteristics comprises drill noise source signature.

18. A method of acquiring and processing seismic data in accordance with claim 16, wherein said first array of seismic receivers is deployed within a borehole, suspended beneath a buoy, or embedded within or deployed in contact with seafloor sediments.

19. A method of acquiring and processing seismic data in accordance with claim 16, further including simultaneously receiving said seismic energy using the second array of seismic receivers, wherein the second array of seismic receivers is deployed on the earth's surface, towed behind a vessel, or deployed on the seafloor.

* * * * *